Aug. 7, 1945.  L. J. BORDO  2,381,431
GATE VALVE
Filed Oct. 21, 1942  2 Sheets-Sheet 1

INVENTOR
Lambert J. Bordo.
BY John D. Myers
ATTORNEY

WITNESS
F. J. Hartman.

Aug. 7, 1945.   L. J. BORDO   2,381,431
GATE VALVE
Filed Oct. 21, 1942   2 Sheets-Sheet 2

WITNESS
F. J. Hartman,

INVENTOR
Lambert J. Bordo.
BY John W. Myers
ATTORNEY

Patented Aug. 7, 1945

2,381,431

UNITED STATES PATENT OFFICE 2,381,431

GATE VALVE

Lambert J. Bordo, North Willow Grove, Pa.

Application October 21, 1942, Serial No. 462,877

3 Claims. (Cl. 251—57)

The invention relates to a gate valve, and is directed specifically to a valve structure in which a valve element is movable transversely of a port into and out of a position over a cooperating valve seat, and locking means is provided for forcing the valve element tightly against the seat so as to effect complete closure of the port and prevent the valve element from being moved out of closed position. As disclosed herein the invention is adapted particularly for use with boilers for blow-down service and with digesters in paper pulp mills, although it is not intended to be limited to such uses.

The common practice in the construction of gate valves is to arrange the wedge valve or closure element so that it may be moved transversely of the inlet port into and out of closing position, a simultaneous wedging action being provided for forcing the movable valve element into close contact with its cooperating seat or seats as this element is moved transversely of the port. With a construction of this type it is difficult to effect a tight closure where the movable valve element is subject to pressure thrust, especially after the valve has been in use for such a time as to subject the movable valve element and the seat to substantial scoring wear. The difficulty in maintaining a tight closure for a movable valve element of this kind is due primarily to the excessive wear which results from the wedging and scraping action of the movable valve element with respect to the seats as the movable element moves into and out of closed position. The composite movement which is necessary in such a valve structure results in such wear on both the movable valve element and the seats that it is difficult, and frequently impossible to maintain the desired close fit between the movable element and the seats. Furthermore, in the operation of such a valve the movable element is often wedged so tightly in its closed position that it is difficult to release it for movement into open position without damage to various parts of the valve, such as the spindle, or the coupling connection between the spindle and the movable valve element.

The above difficulties are overcome in the present improvement by providing a single seated structure wherein the movable valve element acts directly against the pressure of the controlled fluid and is arranged for actuation into and out of position over the inlet port or the valve seat supported thereon, and by providing additional means, operable when the movable valve element is in approximate seating position over the seat, for moving it rectilinearly toward the seat and into tight contact therewith. With such a structure the pressure of the movable valve element upon the seat may be entirely relieved before the movable element is given its transverse movement to open the valve and cutting and scoring of the valve and seat by materials such as scale and sludge may be prevented.

In the prior devices which utilize a wedging action for forcing the movable valve element into contact with the seat, the spindle or the coupling member between the spindle and movable valve element is frequently damaged by reason of the lack of any provision for tranverse movement of the movable valve element with respect to the spindle as the movable element moves into closed position on the seat. With the present improvement the provision of transverse movement of the movable valve element with respect to the spindle permits the movable valve element to be urged toward the valve seat by means of the wedging action of a guideway having side play action, or by means of the improved seating and locking device provided herein, without any danger of injury to the valve member, the spindle, or the coupling means between the valve member and the spindle.

In gate valves of the general type to which the present improvements are directed, it has been common practice to provide a guideway for the movable valve element inside the valve body or casing. Such guideways have been integral with the casing, and it has been difficult to perform such machining, grinding and other operations as are necessary to complete them, particularly in small valves. In the valve disclosed herein, this difficulty has been overcome by the provision of a removable guideway which may be easily inserted in and removed from the valve casing. The construction is further improved by the provision of means, accessible from the outside or inside of the valve casing, for adjusting the guideway toward and away from the valve seat to thereby adjust the extent of contact of the movable element with the seat when the movable element is provided with renewed parts and such parts are fitted in operating position over the seat.

As will be apparent from the above, one of the primary objects of the invention is the provision of means for compressing and locking the movable valve element of a gate valve in closed position. Another object of the invention is the provision of a coupling member between the movable element of a gate valve and its actuating member so that the movable valve element may move transversely of the actuating member into and out of position with respect to the valve seat. A further object of the improvement is the provision of a guideway for the movable valve element, so constructed as to have side play and be easily inserted in and removed from the valve casing. A still further object of the improvement is the provision of adjusting means whereby the guideway for the movable valve element may be adjusted toward and away from the valve seat. Other objects and advantages of the invention will be apparent from the following description, taken with the accompanying drawing wherein:

Figure 1:
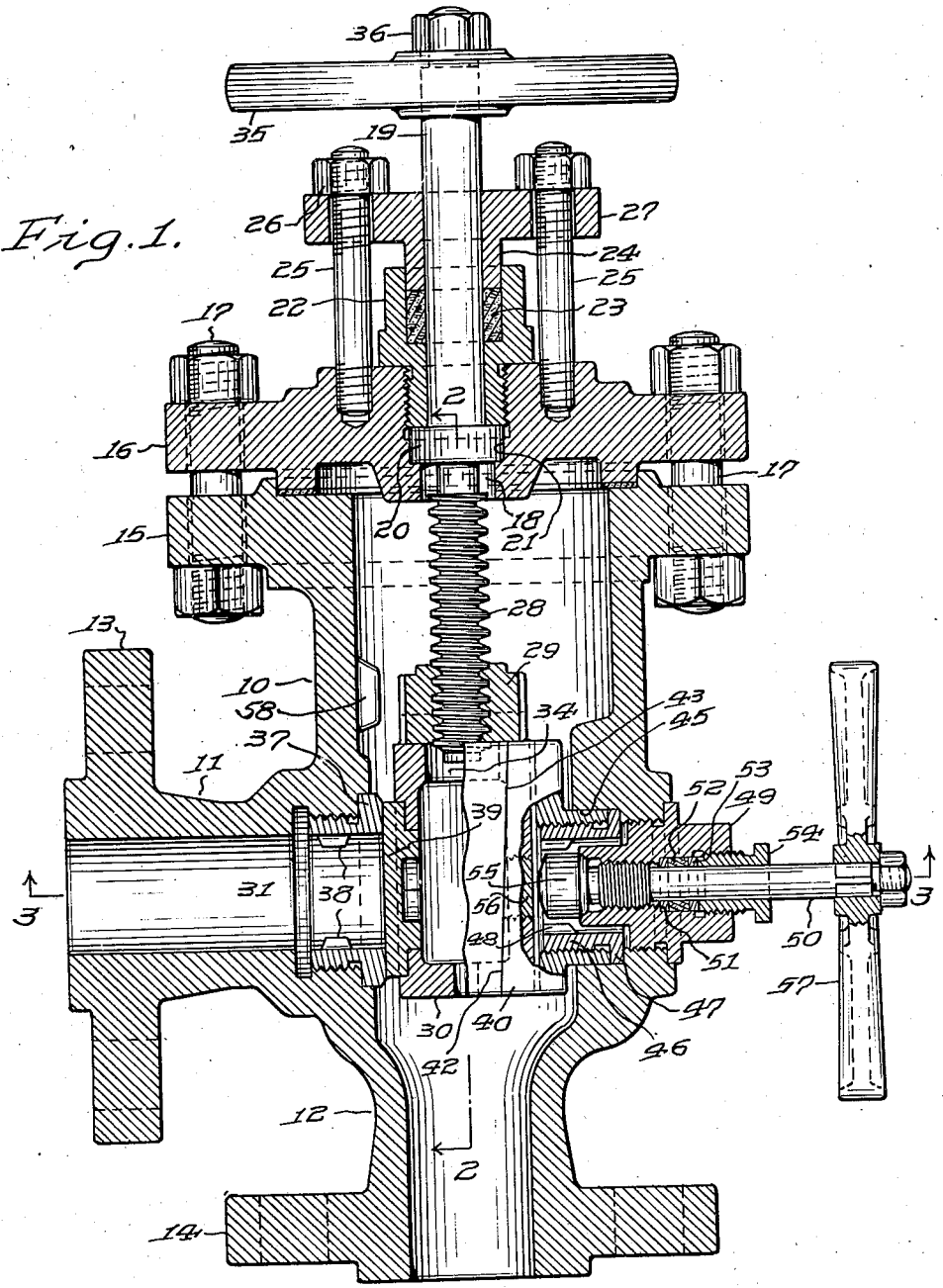
Fig. 1 is a vertical sectional view through a gate valve with the present improvements incorporated therein, the movable valve element being shown in position to be locked on the valve seat.
Figure 2:
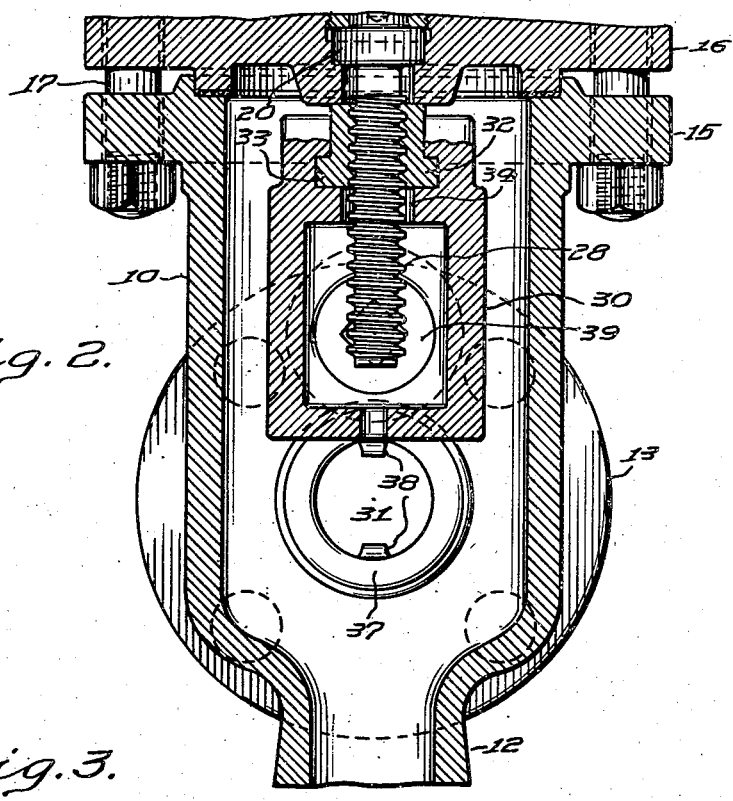
Fig. 2 is a vertical sectional view through the valve shown in Fig. 1, taken on the line 2—2 of Fig. 1, and showing the movable valve element in open position.

While the various features of the present improvement may be employed with other forms of valves, as disclosed herein they are incorporated in a valve body or casing 10 having an inlet connection 11 on one side and an outlet connection 12 on one end. Suitable flanges 13 and 14 may be provided on these connections for attachment to cooperating flanges of a pipe system. The end of the casing opposite the outlet connection 12 is provided with a flange 15 to which a cover plate 16 is secured by bolts 17. The cover plate 16 is provided with a central opening 18 to receive a valve actuating spindle 19. A collar 20 on the spindle 19 rests upon the bottom of an enlargement 21 in the upper portion of the opening 18 to limit movement of the spindle 19 inwardly. Upward movement of the spindle 19 is prevented by a stuffing box 22, the lower end of which is threaded into the upper end of the opening 18 in the cover plate and terminates at the upper face of the collar 20. The stuffing box 22 is provided with suitable packing material 23 which is retained therein around the spindle by the gland 24 secured to the cover plate 16 by studs 25 threaded into the cover plate and having nuts 26 threaded thereon into contact with the flange 27.

The inner end of the spindle 19, within the casing 10, is provided with suitable threads 28 for cooperation with a threaded spindle nut 29 by which the movable valve element 30 is supported and moved into and out of position over the inlet port 31. As will be apparent from the drawings, the lower edge of the nut 29 is provided on opposite edges with extended portions 32 which engage within opposing guideways 33 in the upper end of the movable valve element 30 so that the latter is free to move transversely of the spindle 19 in directions toward and away from the inlet port 31. The movable valve element 30 is hollowed out and provided with an opening 34 in its upper end to receive the threaded portion of the spindle 19 as the nut 29 is moved up and down on the spindle by the rotation thereof. A hand wheel 35 secured on the upper end of the spindle 19 by a nut 36 may be employed for rotating the spindle and thus moving the valve member 30 transversely of the inlet port 31, into and out of approximate seating position thereover.

Figure 3:
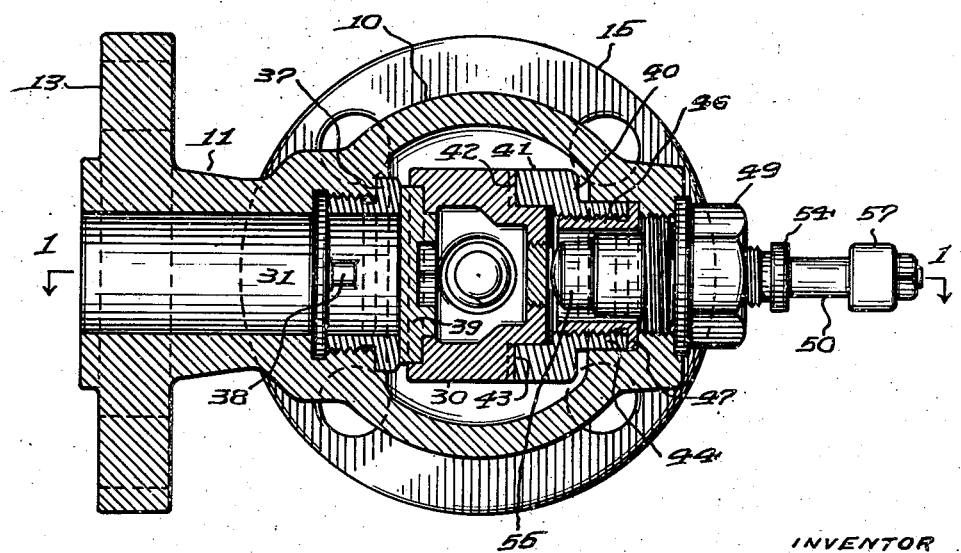
Fig. 3 is a transverse sectional view taken on the line 3—3 of Fig. 1.

The inlet port 31 is provided with a valve seat 37 in the form of a flanged bushing threaded therein and provided with interior lugs 38 so that it may be readily secured in position and removed for replacement. Cooperating with the valve seat 37 is a disk valve member 39 secured in the adjacent face of the movable valve element 30. The disk 39 is preferably so designed and mounted on the movable valve element 30 as to permit it to be rotated while in position over the seat 37 for the purpose of grinding the disk and the seat. A lug 58 in the valve casing prevents the disk 39 from being displaced with respect to the movable valve element 30 when the latter is in open position. The movable valve element 30 is guided in its movements into and out of position over the seat 37 by means of a guideway 40 having outstanding vertical edges 41 which have inclined faces 42 thereon for cooperation with complementary inclined faces 43 on the movable valve element 30 so as to urge the valve element 30 toward the valve seat 37 as the valve element 30 is moved into position over the valve seat 37. As shown in Fig. 3, the valve element is retained against lateral movement with respect to the guideway 40 by the outstanding vertical edges 41 on guideway 40.

The guideway 40 is provided with a circular boss 44 which fits freely into the inner, enlarged end of an opening 45 in the wall of the casing opposite the inlet port 31. A bushing 46 threaded within the boss 44 is provided with an outwardly extending flange 47 which seats upon the bottom of an enlargement in the inner end of the opening 45. As will be apparent from this construction, rotation of the bushing 46 will effect adjustments of the guideway 40 toward and away from the valve seat 37 to thus determine the proper position of the movable valve member 30 with respect to the seat, and the freedom of movement of boss 40 in opening 45 permits ample side play of guideway 40 for easy assembly and operation of the movable valve element 30. By providing lugs 48 in the bushing 46, such adjustments may be easily made from the inside or outside of the valve casing by inserting a suitable tool in the casing or through the opening 45.

The outer end of the opening 45 is threaded to receive a stuffing box 49 in which a valve locking spindle 50 is supported. A packing ring 51, suitable packing material 52, and a follower ring 53 are retained in position in the stuffing box 49, around locking spindle 50, by a stuffing nut 54 threaded in the outer end of the stuffing box. The locking spindle 50 is threaded in the inner end of the stuffing box 49 and its inner end is provided with an enlarged head 55 for engagement with a wear resisting plug 56 secured in the adjacent face of the movable valve element 30. The outer end of the locking spindle is provided with suitable manipulating means such as the handle 57. As will be apparent from the structure just described, when the handle 57 is turned in a direction to advance the locking spindle 50 inwardly through the stuffing box 49, the head 55 will be brought into contact with the plug 56 to thus move the valve member 30 rectilinearly toward the inlet port 31 and force the valve disk 39 tightly into contact with the valve seat 37, notwithstanding any pressure to which the valve disk may be subjected by the controlled fluid at the inlet port. When the handle 57 is moved in a direction to retract the locking spindle 50, the head 55 will be withdrawn from the movable valve element thus leaving it free to be moved by the valve spindle 19 transversely of the inlet port 31, away from valve closing position.

Inasmuch as the operation of the various features of the improvement has been described above in connection with the description of the structure of the parts, no further explanation of the operation is believed to be necessary. While a preferred form of the improvements has been disclosed, together with a certain arrangement of the different parts, it is to be understood that the invention is not intended to be limited to the precise form and arrangement of parts disclosed nor is it essential that all the improved features be used together. The improvements may be employed, for example, with a rising spindle type of valve instead of the non-rising type disclosed herein. The improvements may also be used as a straightway valve by providing an angular outlet connection in place of the outlet connection shown in the drawings, such a form being desirable when the valve is utilized in underground pipe systems for gas, water hydrants, steam and oil. Other forms of locking device may also be used in place of the threaded spindle type disclosed herein. Likewise, the specific form of movable valve member need not be adhered to in the practice of the invention. It will also be understood that other forms of actuating means for the valve spindle may be employed, such as a lever device or motor driven means. The above description and the accompanying drawings are therefore to be regarded as illustrative only and it is to be understood that the invention is susceptible of other forms and arrangements so long as they come within the scope of the appended claims.

What I desire to claim is:

1. In a valve structure wherein a valve member is movable within a casing transversely of an inlet port into and out of position over a valve seat, the combination of a stuffing box removably mounted in the outer end of an opening opposite said port in the wall of said casing, a valve guideway supported in the inner end of said opening and having an aperture therethrough in alignment with the opening through said stuffing box, a locking spindle supported by said stuffing box and having its inner end projecting through the aperture in said guideway for locking said valve member on said seat, and means accessible through said opening upon the removal of said stuffing box and said spindle for adjusting said guideway toward and away from said valve seat.

2. In a valve structure wherein a valve member is movable within a casing transversely of an inlet port into and out of position with respect to a valve seat, the combination of a valve guideway within said casing and having thereon a circular boss freely supported in the inner end of a circular opening opposite said port, and a bushing threaded in said boss and accessible through said opening for adjusting said guideway toward and away from said valve seat.

3. A valve structure comprising a casing having an inlet port therein and an opening opposite said inlet port, a valve member movable transversely of said port to open and close the same, a wedging guideway for said valve member, a boss on said guideway and fitting in said opening for removably positioning said guideway within said casing, and means on said guideway for adjusting the same in said opening toward and away from said port.

LAMBERT J. BORDO.